United States Patent
Tang et al.

(10) Patent No.: US 8,792,245 B2
(45) Date of Patent: Jul. 29, 2014

(54) COIL ASSEMBLY AND ELECTRICAL DEVICE HAVING SUCH COIL ASSEMBLY

(75) Inventors: Pak-Chuen Tang, Hong Kong (CN); Kwong-Ming Ching, Hong Kong (CN); Chung-Hei Poon, Hong Kong (CN)

(73) Assignee: Delta Electronics, Inc., Taoyuan Hsien (TW)

( * ) Notice: Subject to any disclaimer, the term of this patent is extended or adjusted under 35 U.S.C. 154(b) by 285 days.

(21) Appl. No.: 13/033,371

(22) Filed: Feb. 23, 2011

(65) Prior Publication Data

US 2012/0051009 A1  Mar. 1, 2012

(30) Foreign Application Priority Data

Aug. 30, 2010  (CN) .......................... 2010 1 0269912

(51) Int. Cl.
*H05K 5/00* (2006.01)
*H05B 6/12* (2006.01)

(52) U.S. Cl.
CPC .................................... *H05B 6/1245* (2013.01)
USPC ..................................... 361/752; 361/679.01

(58) Field of Classification Search
CPC ........... H05B 6/1245; H05B 2206/022; H05B 6/1254; H05B 6/1272; Y02B 40/126
USPC ............ 361/679.01, 752, 748; 174/250, 255, 174/260; 29/605
See application file for complete search history.

(56) References Cited

U.S. PATENT DOCUMENTS

| | | | | |
|---|---|---|---|---|
| 3,256,417 A | * | 6/1966 | Merrett | 219/675 |
| 3,781,503 A | * | 12/1973 | Harnden et al. | 219/622 |
| 6,144,019 A | * | 11/2000 | Garcia et al. | 219/624 |
| 6,956,188 B2 | * | 10/2005 | de Rooij et al. | 219/619 |
| 2011/0109415 A1 | * | 5/2011 | Duh et al. | 336/200 |

FOREIGN PATENT DOCUMENTS

JP  201033885  2/2010

* cited by examiner

*Primary Examiner* — Yuriy Semenenko
(74) *Attorney, Agent, or Firm* — Kirton McConkie; Evan R. Witt

(57) ABSTRACT

An electrical device includes a coil assembly and a case structure. The coil assembly includes plural coil units in a stack arrangement. Each of the coil units includes alternate loops and vacant portions. The loops of each coil unit are aligned with the vacant portions of an adjacent coil unit. There is a spacing interval between every two adjacent loops of every two adjacent coil units. The case structure has a receptacle for accommodating the coil assembly.

12 Claims, 14 Drawing Sheets

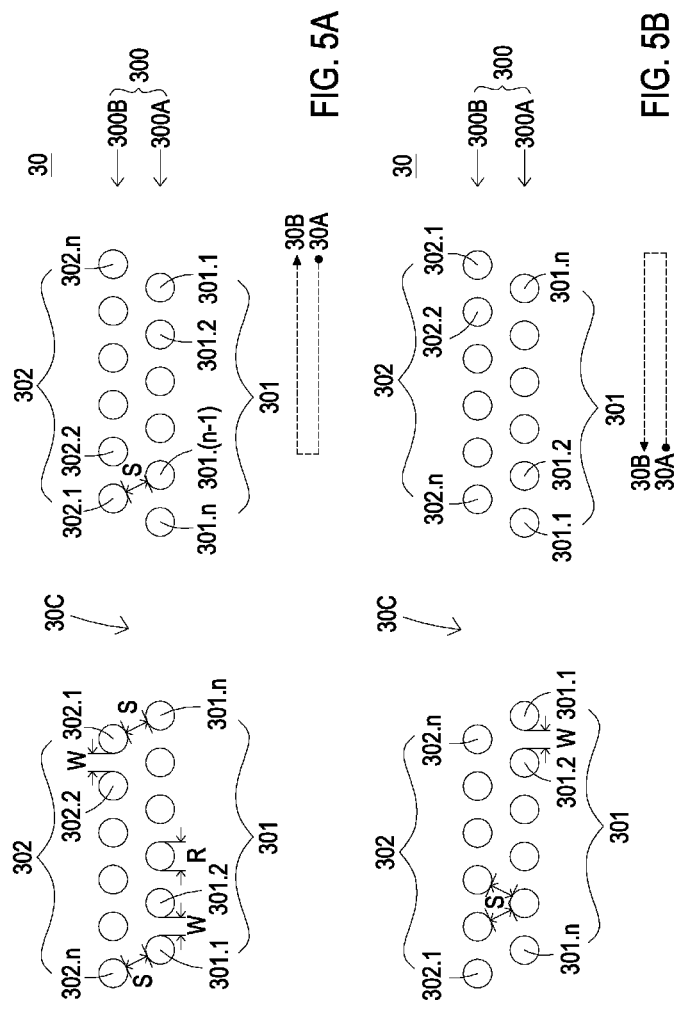

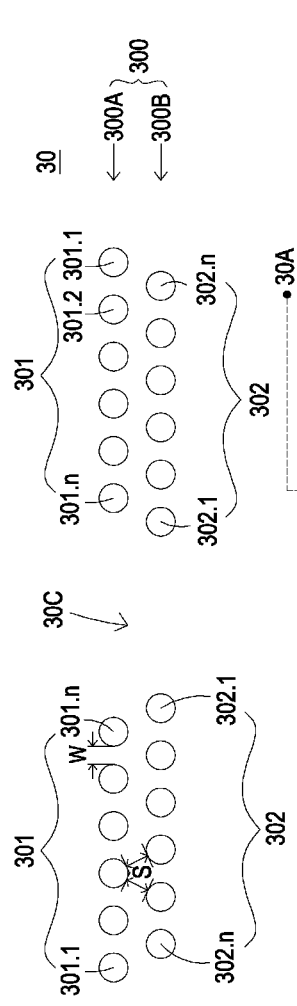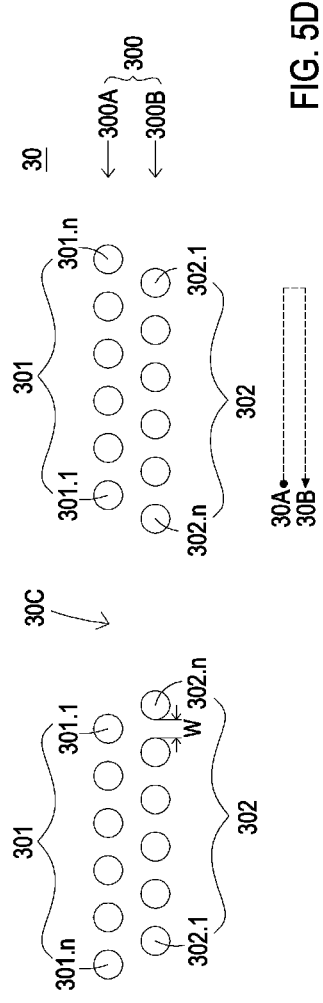

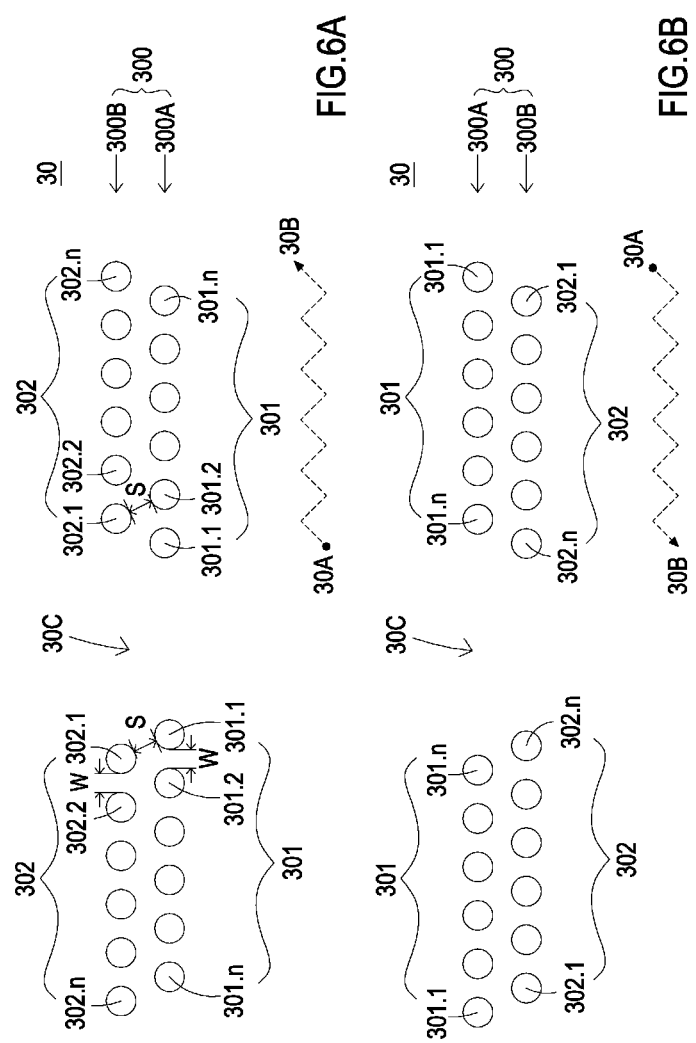

COIL ASSEMBLY AND ELECTRICAL DEVICE HAVING SUCH COIL ASSEMBLY

FIELD OF THE INVENTION

The present invention relates to a coil assembly, and more particularly to a coil assembly of an electrical device. The present invention also related to a method for fabricating the coil assembly and an electrical device having the coil assembly.

BACKGROUND OF THE INVENTION

With increasing progress of technology and science, many electrical devices are developed toward miniaturization, high performance and high heat-dissipating efficiency. As known, it is difficult to produce an electrical device having all of the benefits of miniaturization, high performance and high heat-dissipating efficiency.

Take an induction cooker for example. The induction cooker usually has an induction coil. When a current flows through an induction coil of the induction cooker, electromagnetic induction is performed to produce eddy current, thereby heating a foodstuff container. FIG. 1 is a schematic view illustrating a conventional induction coil. As shown in FIG. 1, the induction coil 10 has a multi-turn planar spiral coil structure by winding a conductive wire 11 for many turns of loops on the same plane. Since all loops 101 of the induction coil 10 are closely arranged, the diameter D1 of the induction coil 10 is smaller than the foodstuff container (not shown) without impairing the performance of the electrical device. However, since the closely arranged loops 101 may hinder passage of airflow, the efficacy of the forced convection within the electrical device is impaired and a large back pressure is generated. Moreover, when electric current passes through the induction coil 10, every two adjacent loops 101 may interfere with each other. In this situation, the magnitude of eddy current between the two adjacent loops 101 is increased, the conduction loss is increased, and the performance of the electrical device is deteriorated.

For solving the above drawbacks, another induction coil is disclosed. FIG. 2 is a schematic view illustrating another conventional induction coil. In the induction coil 20 of FIG. 2, there is a vacant portion G between every two adjacent loops 201. Although the use of the induction coil 20 may increase the heat-dissipating efficiency, there are still some drawbacks. For example, since the diameter D2 of the induction coil 20 is too large, the overall volume of the electrical device is increased. In addition, if the foodstuff container fails to fully shelter the induction coil 20, the operating efficiency of the electrical device is unsatisfied.

Therefore, there is a need of providing a coil assembly, a fabricating method for the coil assembly and an electrical device having the coil assembly so as to obviate the drawbacks encountered from the prior art.

SUMMARY OF THE INVENTION

The present invention provides a coil assembly of an electrical device for increasing the heat-dissipating efficiency, reducing the back pressure and reducing the conduction loss without largely increasing the diameter of coil assembly.

The present invention also provides a coil assembly of an electrical device for optimizing the performance of the electrical device by adjusting the distance between the coil assembly and the upper case of the case structure.

In accordance with a first aspect of the present invention, there is provided an electrical device. The electrical device includes a coil assembly and a case structure. The coil assembly includes plural coil units in a stack arrangement. Each of the coil units comprises alternate loops and vacant portions. The loops of each coil unit are aligned with the vacant portions of an adjacent coil unit. There is a spacing interval between every two adjacent loops of every two adjacent coil units. The case structure has a receptacle for accommodating the coil assembly.

In accordance with a second aspect of the present invention, there is provided a coil assembly for use in an electrical device. The coil assembly includes plural coil units in a stack arrangement. Each of the coil units comprises alternate loops and vacant portions. The loops of each coil unit are aligned with the vacant portions of an adjacent coil unit. There is a spacing interval between every two adjacent loops of every two adjacent coil units.

In accordance with a third aspect of the present invention, there is provided a method for fabricating a coil assembly of an electrical device. The method includes steps of (a) providing a conductive article; and (b) winding the conductive article to produce plural coil units in a stack arrangement, wherein each of the coil units includes alternate loops and vacant portions, the loops of each coil unit are aligned with the vacant portions of an adjacent coil unit, and there is a spacing interval between every two adjacent loops of every two adjacent coil units.

The above contents of the present invention will become more readily apparent to those ordinarily skilled in the art after reviewing the following detailed description and accompanying drawings, in which:

BRIEF DESCRIPTION OF THE DRAWINGS

FIGS. 5A~5D are schematic cross-sectional views illustrating some exemplary coil assemblies produced by the first winding approach according to an embodiment of the present invention;

FIGS. 6A and 6B are schematic cross-sectional views illustrating some exemplary coil assemblies produced by the second winding approach according to an embodiment of the present invention;

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 3A:
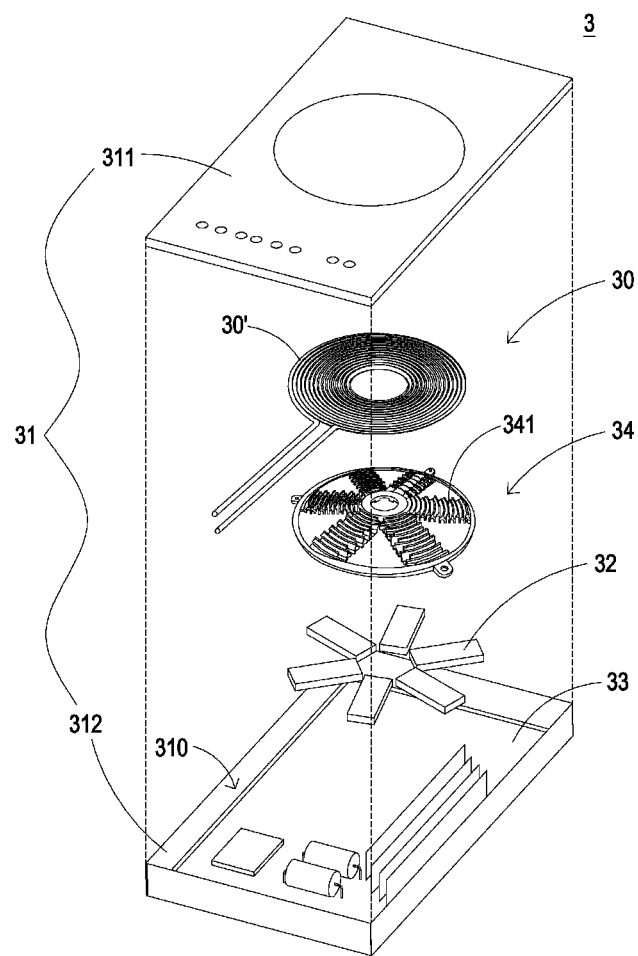
FIG. 3A is a schematic exploded view illustrating an electrical device according to an embodiment of the present invention.
Figure 3B:
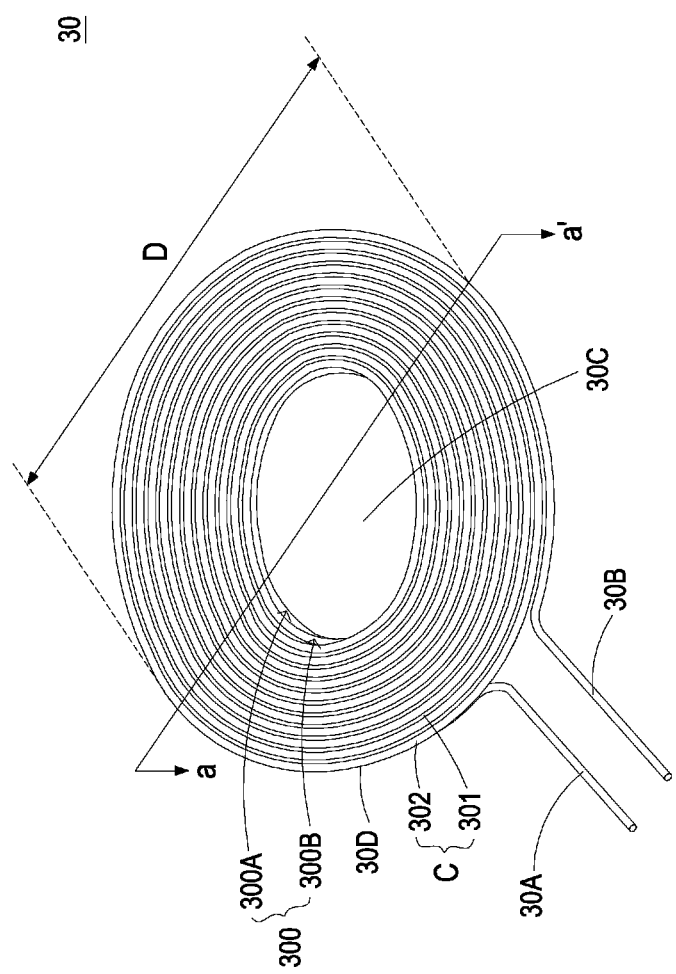
FIG. 3B is a schematic view illustrating a coil assembly of the electrical device of FIG. 3A.

FIG. 3A is a schematic exploded view illustrating an electrical device according to an embodiment of the present invention. FIG. 3B is a schematic view illustrating a coil assembly of the electrical device of FIG. 3A. Please refer to FIGS. 3A and 3B. The electrical device 3 comprises a coil assembly 30 and a case structure 31. The coil assembly 30 comprises plural coil units 300 in a stack arrangement. Each of the coil units 300 comprises alternate loops 301 (or 302) and vacant portions W. The loops 301 (or 302) of each coil unit 300 are aligned with the vacant portions W of an adjacent coil unit. In addition, there is a spacing interval S between every two adjacent loops 301 and 302 of every two adjacent coil units 300 (see FIG. 5A). The case structure 31 has a receptacle 310 for accommodating the coil assembly 30. In this embodiment, the electrical device 3 includes but is not limited to an induction cooker. For clarification, the loops 301, 302 and 303 of respective coil units 300 may also be indicated by a symbol "C". Hereinafter, the configurations of the electrical device 3 will be illustrated in more details.

Please refer to FIGS. 3A and 3B again. The coil assembly 30 comprises plural coil units 300. Each of the coil units 300 has a multi-turn spiral coil structure by winding a conductive article 30' for many turns of loops. An example of the conductive article 30' includes but is not limited to a conductive wire, a combination of plural litz wires, a metal foil or any other conductive and flexible article. Furthermore, the coil assembly 30 comprises a first terminal 30A, a second terminal 30B, a central hollow portion 30C and an outer border 30D. In this embodiment, each of the coil units 300 has a multi-turn spiral coil structure by winding a conductive wire for many turns of loops. In addition, the coil assembly 30 comprises two coil units 300, e.g. a first coil unit 300A and a second coil unit 300B. The first coil unit 300A comprises plural loops 301. The second coil unit 300B comprises plural loops 302. These two coil units 300A and 300B are coaxial to collectively define the central hollow portion 30C of the coil assembly 30. The first terminal 30A and the second terminal 30B are two free ends of the coil assembly 30.

Figure 4:
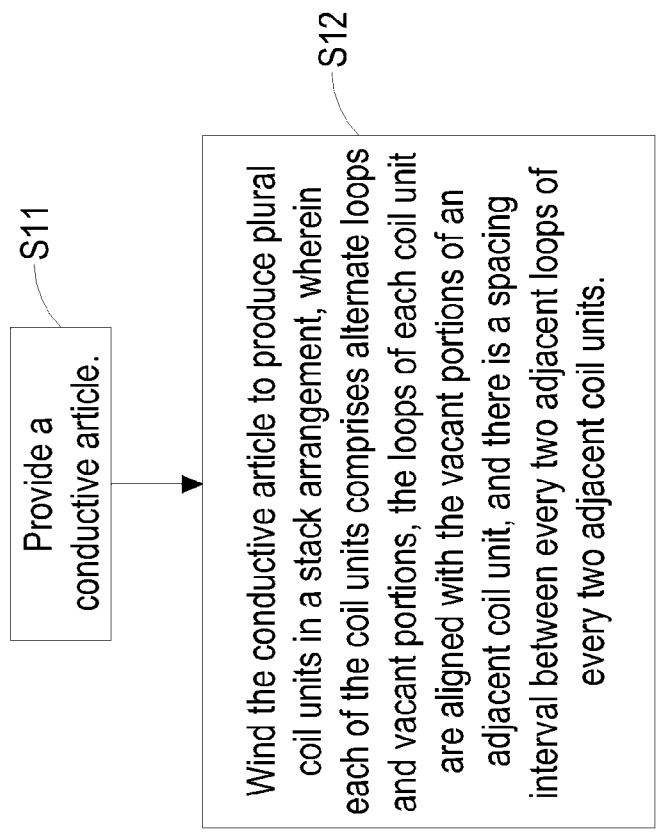
FIG. 4 is a flowchart illustrating a method for fabricating the coil assembly according to an embodiment of the present invention.

FIG. 4 is a flowchart illustrating a method for fabricating the coil assembly according to an embodiment of the present invention. Firstly, in Step S11, a conductive article 30' is provided. Then, in Step S12, by winding the conductive article 30' for many turns of loops, plural coil units 300 are stacked on each other. Each coil unit 300 comprises alternate loops C and vacant portions W. The loops of each coil unit 300 are aligned with the vacant portions W of an adjacent coil unit 300. In addition, there is a spacing interval S between every two adjacent loops C of every two adjacent coil units 300. According to the present invention, two approaches of winding the conductive article 30' are provided. In the first approach, after plural loops C of a coil unit 300 are formed by winding the conductive article 30', plural loops C of an adjacent coil unit 300 are formed. In the second approach, the conductive article 30' is successively wound around the central hollow portion 30C and alternately moved between the plural coil units 300, wherein only a single loop is formed at each time.

Hereinafter, some exemplary coil assemblies produced by the first winding approach will be illustrated with reference to FIGS. 5A~5D. FIG. 5A is a schematic cross-sectional view illustrating a coil assembly of FIG. 3B and taken along the line a-a'. FIGS. 5B~5D are schematic cross-sectional view illustrating three variation examples of the coil assembly of FIG. 5A. As shown in FIGS. 5A~5D, the coil assembly 30 comprises a first coil unit 300A and a second coil unit 300B. In the first approach, after plural loops 301 of the first coil unit 300A are formed by winding the conductive article 30', plural loops 302 of the second coil unit 300B are formed. In FIGS. 5A~5D, the sequences of winding the conductive article 30' are indicated by the dotted arrows.

Please refer to FIG. 5A. In this embodiment, the conductive article 30' is a single conductive wire with a diameter R. Firstly, a free end of the conductive article 30' is used as the first terminal 30A of the coil assembly 30. Then, by winding the conductive article 30' around the central hollow portion 30C, a first loop 301.1 is formed. Then, by internally winding the conductive article 30' around the central hollow portion 30C at the vacant portion W from the first loop 301.1, a second loop 301.2 is formed. Similarly, by continuously winding the conductive article 30' around the central hollow portion 30C at the vacant portion W, the third loop 301.3, the fourth loop 301.4, . . . , and the $n^{th}$ loop 301.n are successively formed. Meanwhile, n loops 301 are formed on the same plane. In addition, the n loops 301 and (n−1) vacant portions W between the n loops 301 collectively define the first coil unit 300A of the coil assembly 30. Then, the conductive article 30' is moved to a specified position, which is arranged above the first coil unit 300A, located between the $n^{th}$ loop 301.n and the $(n-1)^{th}$ loop 301.(n−1), and spaced from the $n^{th}$ loop 301.n and the $(n-1)^{th}$ loop 301.(n−1) by the spacing interval S. Then, by winding the conductive article 30' around the central hollow portion 30C, a first loop 302.1 of the second coil unit 300B is formed. Then, by externally winding the conductive article 30' around the central hollow portion 30C at the vacant portion W from the first loop 302.1, a second loop 302.2 is formed. Similarly, by continuously winding the conductive article 30' around the central hollow portion 30C at the vacant portion W, the third loop 302.3, the fourth loop 302.4, . . . , and the $n^{th}$ loop 302.n are successively formed. Meanwhile, n loops 302 are formed on the same plane. In addition, the n loops 302 and (n−1) vacant portions W between the n loops 302 collectively define the second coil unit 300B of the coil assembly 30. Then, the conductive article 30' extended from the $n^{th}$ loop 302.n is used as the second terminal 30B of the coil assembly 30.

In the coil assembly 30 of FIG. 5A, the loops 301 of the first coil unit 300A and the loops 302 of the second coil unit 300B are contiguous. In addition, the $n^{th}$ loop 302.n of the first coil unit 300A is connected with the first loop 302.1 of the second coil unit 300B. The loops 301 of the first coil unit 300A are aligned with the vacant portions W of the second coil unit 300B; and the loops 302 of the second coil unit 300B are aligned with the vacant portions W of the first coil unit 300A. Moreover, there is a spacing interval S between every two adjacent loops 301 and 302 of the first coil unit 300A and the second coil unit 300B. For example, the first loop 301.1 of the first coil unit 300A is spaced from the n$^{th}$ loop 302.n and the (n−1)$^{th}$ loop 302.(n−1) of the second coil unit 300B by the spacing interval S. The n$^{th}$ loop 301.n of the first coil unit 300A and the first loop 302.1 of the second coil unit 300B collectively define the central hollow portion 30C of the coil assembly 30. The first loop 301.1 of the first coil unit 300A and the n$^{th}$ loop 302.n of the second coil unit 300B collectively define the outer border 30D of the coil assembly 30. The first terminal 30A and the second terminal 30B are close to the outer border 30D of the coil assembly 30.

Please refer to FIG. 5B. The process of producing the coil assembly 30 of FIG. 5B is similar to that of FIG. 5A. In this embodiment, the plural loops 301 of the first coil unit 300A are form by successively and externally winding the conductive article 30' around the central hollow portion 30C. Then, the conductive article 30' is moved to a specified position, which is arranged above the first coil unit 300A, located between the n$^{th}$ loop 301.n and the (n−1)$^{th}$ loop 301.(n−1), and spaced from the n$^{th}$ loop 301.n and the (n−1)$^{th}$ loop 301.(n−1) by the spacing interval S. Then, the plural loops 302 of the second coil unit 300B are form by successively and internally winding the conductive article 30' around the central hollow portion 30C.

The process of producing the coil assembly 30 of FIG. 5C is similar to that of FIG. 5A except that the second coil unit 300B is arranged under the first coil unit 300A. The process of producing the coil assembly 30 of FIG. 5D is similar to that of FIG. 5B except that the second coil unit 300B is arranged under the first coil unit 300A.

Hereinafter, some exemplary coil assemblies produced by the second winding approach will be illustrated with reference to FIGS. 6A and 6B. As shown in FIGS. 6A and 6B, the coil assembly 30 also includes a first coil unit 300A and a second coil unit 300B. In the second approach, the conductive article 30' is successively wound around the central hollow portion 30C and alternately moved between the first coil unit 300A and the second coil unit 300B, wherein only a single loop 301 or 302 is formed at each time. In FIGS. 6A and 6B, the sequences of winding the conductive article 30' are indicated by the dotted arrows.

Please refer to FIG. 6A. Firstly, by winding the conductive article 30' around the central hollow portion 30C, a first loop 301.1 of the first coil unit 300A is formed. Then, the conductive article 30' is externally moved to a specified position, which is arranged above the first coil unit 300A and spaced from the first loop 301.1 by the spacing interval S. Then, by winding the conductive article 30' around the central hollow portion 30C, a first loop 302.1 of the second coil unit 300B is formed. Then, the conductive article 30' is externally moved to a specified position, which is arranged under the second coil unit 300B, spaced from the first loop 302.1 by the spacing interval S and separated from the first loop 301.1 by the vacant portion W. Then, by winding the conductive article 30' around the central hollow portion 30C, a second loop 301.2 of the first coil unit 300A is formed. Then, the conductive article 30' is externally moved to a specified position, which is arranged above the second coil unit 300B, spaced from the second loop 301.2 by the spacing interval S and separated from the first loop 302.1 by the vacant portion W. Then, by winding the conductive article 30' around the central hollow portion 30C, a second loop 302.2 of the second coil unit 300B is formed. The above steps are repeatedly done until the plural loops 301 of the first coil unit 300A and the plural loops 302 of the second coil unit 300B are formed. Meanwhile, the second coil unit 300B is stacked on the first coil unit 300A. In addition, any loop 301 of the first coil unit 300A is connected with the adjacent loop 302 of the second coil unit 300B, so that the loops 301 and 302 of the coil assembly 30 are contiguous. Moreover, the first loop 301.1 of the first coil unit 300A and the first loop 302.1 of the second coil unit 300B collectively define the central hollow portion 30C of the coil assembly 30; and the n$^{th}$ loop 301.n of the first coil unit 300A and the n$^{th}$ loop 302.n of the second coil unit 300B collectively define the outer border 30D of the coil assembly 30.

The process of producing the coil assembly 30 of FIG. 6B is similar to that of FIG. 6A except that the second coil unit 300B is arranged under the first coil unit 300A. Therefore, the loops 301 and 302 of the first coil unit 300A and the second coil unit 300B are formed by externally winding the conductive article 30' around the central hollow portion 30C.

Figure 7A:
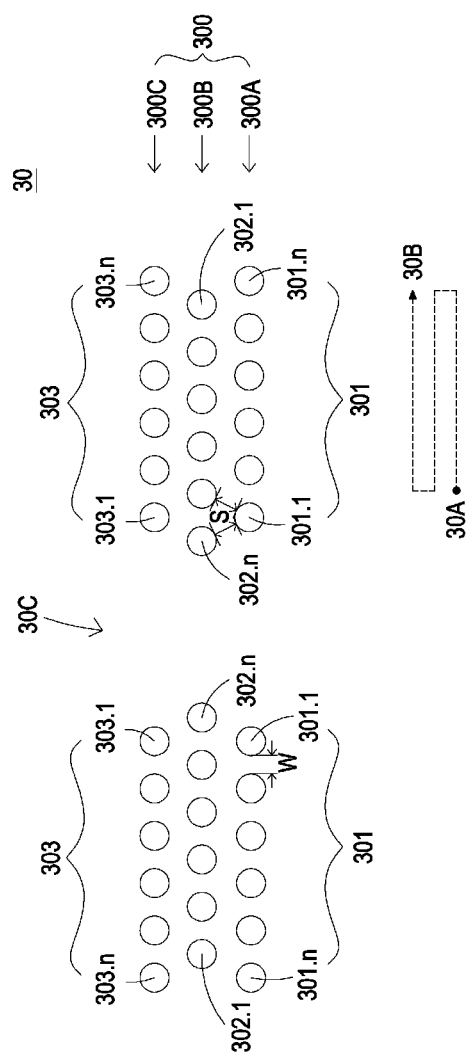
FIGS. 7A and 7B are schematic cross-sectional views illustrating some exemplary coil assemblies produced by the first winding approach according to another embodiment of the present invention.
Figure 7B:
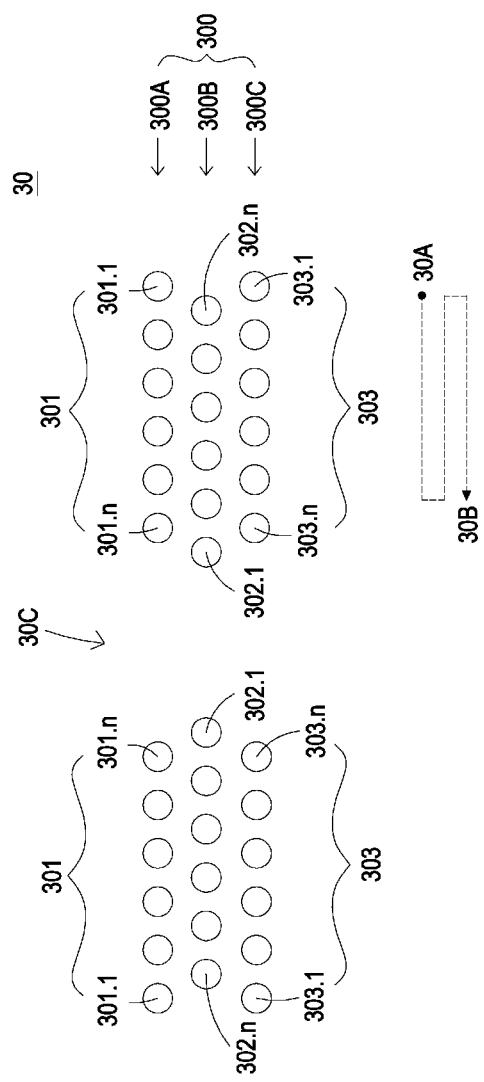

Moreover, according to the practical requirements, the number of coil units of the coil assembly 30 may be increased. FIGS. 7A and 7B are schematic cross-sectional views illustrating some exemplary coil assemblies produced by the first winding approach according to another embodiment of the present invention. As shown in FIGS. 7A and 7B, the coil assembly 30 includes a first coil unit 300A, a second coil unit 300B and a third coil unit 300C.

Please refer to FIG. 7A. Firstly, plural loops 301 of the first coil unit 300A are form by successively and externally winding the conductive article 30' around the central hollow portion 30C. Then, the conductive article 30' is moved to a specified position, which is arranged above the first coil unit 300A, located between the n$^{th}$ loop 301.n and the (n−1)$^{th}$ loop 301.(n−1), and spaced from the n$^{th}$ loop 301.n and the (n−1)$^{th}$ loop 301.(n−1) by the spacing interval S. Then, the plural loops 302 of the second coil unit 300B are form by successively and internally winding the conductive article 30' around the central hollow portion 30C. Then, the conductive article 30' is moved to a specified position, which is arranged above the first coil unit 300A, located between the n$^{th}$ loop 302.n and the (n−1)$^{th}$ loop 302.(n−1), and spaced from the n$^{th}$ loop 302.n and the (n−1)$^{th}$ loop 302.(n−1) by the spacing interval S. Then, plural loops 303 of the third coil unit 300C are form by successively and externally winding the conductive article 30' around the central hollow portion 30C.

The process of producing the coil assembly 30 of FIG. 7B is similar to that of FIG. 7A except that the second coil unit 300B is arranged under the first coil unit 300A and the third coil unit 300C is arranged under the second coil unit 300B.

It is noted that the coil assembly 30 with three coil units 300 may be produced by the second winding approach.

Please refer to FIGS. 5A~5D and 6A~6B again. In the coil assembly 30, the first coil unit 300A comprises alternate loops 301 and vacant portions W; and the second coil unit 300B comprises alternate loops 302 and vacant portions W. It is preferred that the vacant portion W is smaller than the diameter R of the conductive article R. In addition, the loops 301 of the first coil unit 300A and the loops 302 of the second coil unit 300B are staggered. That is, the loops 301 of the first coil unit 300A are aligned with corresponding vacant portions W of the second coil unit 300B; and the loops 302 of the second coil unit 300B are aligned with corresponding vacant portions W of the first coil unit 300A. In addition, there is a spacing interval S between any loop 301 of the first coil unit 300A and an adjacent loop 302 of the second coil unit 300B. The magnitude of the spacing interval S is selected such that airflow is transmissible thereto and eddy current is not generated. Moreover, if the number of coil units 300 of the coil assembly 30 is increased (see FIGS. 7A and 7B), the relationship between the plural loops 303 of the third coil unit 300C and the relationship between the plural loops 303 and the plural loops 302 of the second coil unit 300B are similar to the relationships between the second coil unit 300B and the first coil unit 300A, and are not redundantly described herein.

Moreover, the outward appearance of the coil assembly 30 is substantially identical. However, depending on the winding approach (e.g. the first winding approach or the second winding approach) and the number of coil units 300 of the coil assembly 30, the positions of the first terminal 30A and the second terminal 30B may be varied. In some embodiments, both of the first terminal 30A and the second terminal 30B are arranged beside the outer border 30D of the coil assembly 30 (see FIG. 5A and FIG. 5C). In some embodiments, both of the first terminal 30A and the second terminal 30B are arranged beside the central hollow portion 30C of the coil assembly 30 (see FIG. 5B and FIG. 5D). In some embodiments, the first terminal 30A and the second terminal 30B are respectively arranged beside the central hollow portion 30C and the outer border 30D (see FIG. 6A and FIG. 7A). In some embodiments, the first terminal 30A and the second terminal 30B are respectively arranged beside the outer border 30D and the central hollow portion 30C (see FIG. 6B and FIG. 7B). In a case that both of the first terminal 30A and the second terminal 30B are arranged in either the central hollow portion 30C or the outer border 30D (see FIGS. 5A~5D), the first terminal 30A and the second terminal 30B may be connected to the circuit board 33 more easily. Under this circumstance, the connecting line (not shown) for connecting the coil assembly 30 and the circuit board 33 will be saved and the possible interference resulting from the connecting line will be minimized.

Please refer to FIG. 3A again. In addition to the coil assembly 30, the electrical device 3 further includes a case structure 31, a magnetic element 32, a circuit board 33 and an insulation structure 34. The insulation structure 34 is made of insulating and low-permeability material (e.g. plastic, wood, or the like). Depending on the coil assembly 30, the insulation structure 34 may be modified. For example, the insulation structure 34 is optionally provided with plural grooves 341. The grooves 341 may facilitate positioning the coil units 300 and the loops C of all coil units 300. In this embodiment, the magnetic element 32 includes plural magnets, which are radially arranged under the coil assembly 30 and disposed on the insulation structure 34. It is preferred that the coil assembly 30 is separated from the magnetic element 32 by the insulation structure 34. Moreover, the coil assembly 30, the insulation structure 34 and the magnetic element 32 may be included in a module and accommodated within the case structure 31.

Figure 8:
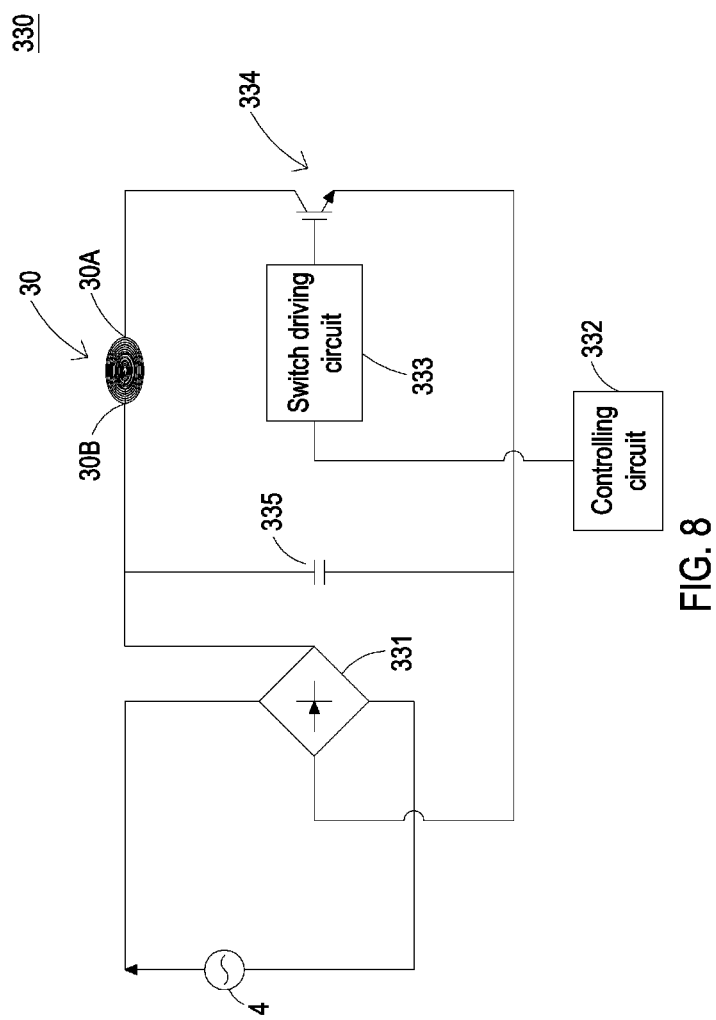
FIG. 8 is a schematic circuit block diagram illustrating a coil driving circuit of the electrical device according to an embodiment of the present invention.

Moreover, a coil driving circuit 330 is mounted on the circuit board 330 of the electrical device 3. FIG. 8 is a schematic circuit block diagram illustrating a coil driving circuit of the electrical device according to an embodiment of the present invention. As shown in FIG. 8, the coil driving circuit 330 comprises a rectifier 331, a controlling circuit 332, a switch driving circuit 333 and a switch element 334. The rectifier 331 is connected to an input power source (e.g. utility power source) for receiving an input current and rectifying the input current. The controlling circuit 332 is connected with the switch driving circuit 333. The switch element 334 is also connected with the switch driving circuit 333. The switch driving circuit 333 is controlled by the controlling circuit 332 to control the on/off states of the switch element 334. Optionally, the coil driving circuit 330 further includes a capacitor 335. The capacitor 335 is connected with an output terminal of the rectifier 331 for filtering off noise. The first terminal 30A and the second terminal 30B of the coil assembly 30 are respectively connected with the switch element 334 and the rectifier 331 (see FIG. 8). Alternatively, in some embodiments, the first terminal 30A and the second terminal 30B of the coil assembly 30 are respectively connected with the rectifier 331 and the switch element 334.

Figure 9A:
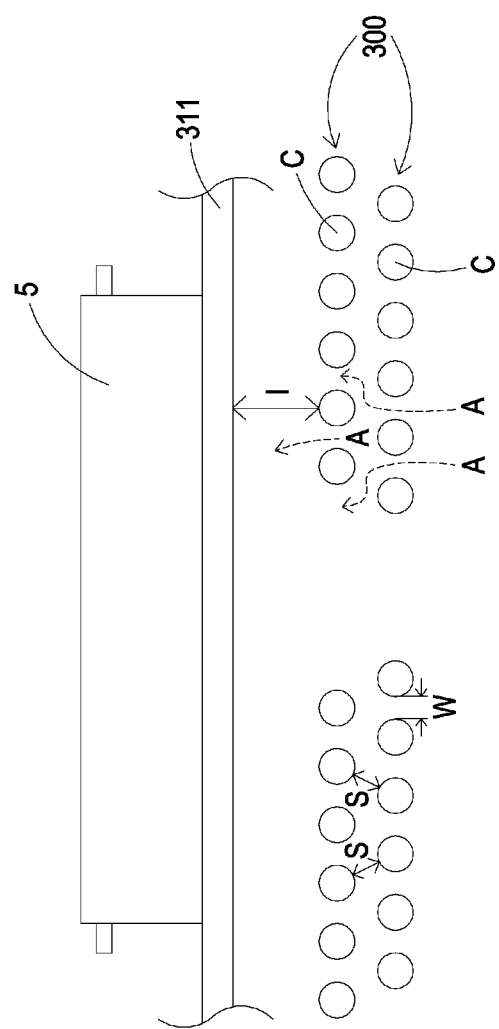
FIG. 9A is a schematic cross-sectional view illustrating the relative locations of the upper case of the case structure and the coil assembly according to a first layout example of the present invention.

Please refer to FIG. 3A again. The coil assembly 30, the magnetic element 32, the circuit board 33 and the insulation structure 34 may be accommodated within the case structure 31. In this embodiment, the case structure 31 includes an upper case 311 and a lower case 312. The lower case 312 has a specified depth. The upper case 311 is a slab made of insulating material (e.g. glass), so that a conductor 5 (e.g. a foodstuff container as shown in FIG. 9A) may be placed on the upper case 311. Consequently, the upper case 311 and the lower case 312 collectively define the receptacle 30 for accommodating the coil assembly 30, the magnetic element 32, the circuit board 33 and the insulation structure 34.

FIG. 9A is a schematic cross-sectional view illustrating the relative locations of the upper case of the case structure and the coil assembly according to a first layout example of the present invention. After the coil assembly 30 is accommodated within the receptacle 310, each loop C of the coil unit 300 that is the closest to the upper case 311 is separated from the upper case 311 by a specified distance I. For shortening the magnetic path of the electrical device 3 and enhancing the overall operating efficiency of the electrical device 3, the distance I may be adjusted according to the practical requirements.

Figure 1:
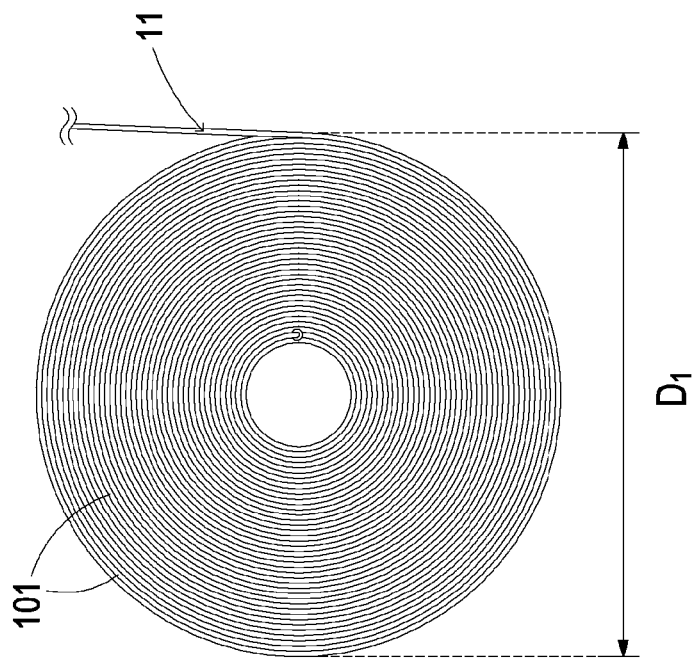
FIG. 1 is a schematic circuit diagram illustrating a conventional induction coil.
Figure 2:
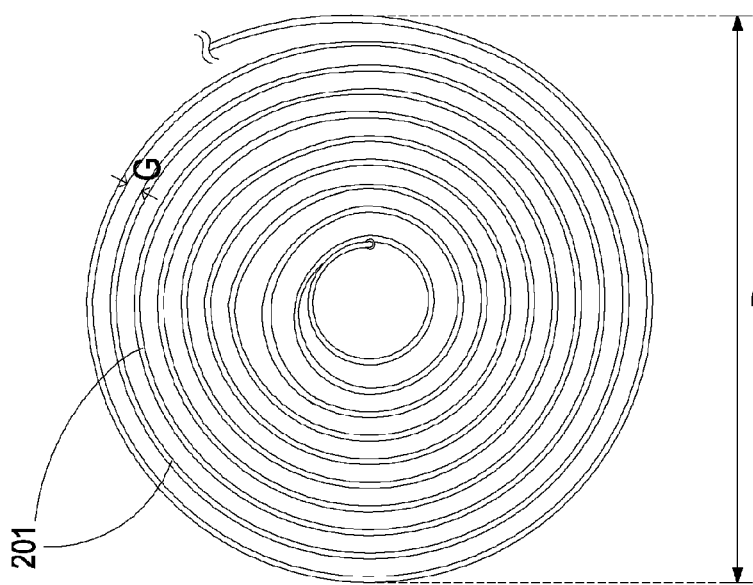
FIG. 2 is a schematic view illustrating another conventional induction coil.

During operation of the electrical device 3, an electric current flows through the plural loops C of the coil assembly 30 to generate a magnetic field. The magnetic field interacts with the magnetic field to generate electromagnetic induction. After the foodstuff container 5 is placed on the upper case 311 of the electrical device 3, the magnetic flux passing through the foodstuff container 5 is changed, and thus an eddy current is produced. In the foodstuff container 5, the eddy current is converted into heat energy to heat the foodstuff container 5. Moreover, since the forced-convection airflow A may flow through the vacant portion W and the spacing interval S without being hindered by the coil assembly 30 (see FIG. 9A), the heat energy will be effectively dissipated away by the airflow A, and the heat-efficiency of the electrical device 3 is enhanced. Moreover, since there is a vacant portion W between every two adjacent loops C of each coil unit 300, the interference between the loops C will be reduced. Moreover, since the coil units 300 of the coil assembly 30 are stacked on each other, the diameter D of the coil assembly 30 is not considerably increased even if there is a vacant portion W between every two adjacent loops C of each coil unit 300. Consequently, the problem of increasing the diameter D2 of the induction coil 20 resulting from the vacant portion G (see FIG. 2) will be eliminated. In other words, the coil assembly 30 of the present invention is advantageous for increasing the heat-dissipating efficiency and the operating efficiency of the electrical device 3 without considerably increasing the diameter D of the coil assembly 30.

Please refer to FIG. 8 as well as FIGS. 5A~5D and 7A~7B. In a case that the coil assembly 30 is fabricated by the first winding approach and the first terminal 30A and the second terminal 30B are respectively connected with the switch element 334 and the rectifier 331, the coil unit 300 that is connected with the first terminal 30A (e.g. the first coil unit 300A as shown in FIGS. 5A~5D and 7A~7B) is a higher-frequency part, and the coil unit 300 that is connected with the second terminal 300B (e.g. the second coil unit 300B as shown in FIGS. 5A~5D and the third coil unit 300C as shown in 7A~7B) is a lower-frequency part. That is, in a case that the coil assembly 30 is fabricated by the first winding approach and the coil assembly 30 is electrically connected with the coil driving circuit 330, the higher-frequency part and the lower-frequency part may be distinguished from each other in order to minimize the interference between the higher-frequency part and the lower-frequency part.

Moreover, for enhancing the performance of the electrical device 3, the higher-frequency coil unit 300 is arranged beside the upper case 321. For example, in a case that the coil assembly 30 is fabricated by the first winding approach and the first terminal 30A is connected with the switch element 334, the first coil unit 300A is operated at a higher frequency than the second coil unit 300B. Meanwhile, the first coil unit 300A is disposed at the top layer (see FIGS. 5C, 5D and 7B). Since the first coil unit 300A operated at the higher frequency is close to the upper case 311, the distance I between the upper case 311 and the first coil unit 300A is reduced, and the heating performance is enhanced.

Whereas, in a case that the coil assembly 30 is fabricated by the first winding approach and the first terminal 30A and the second terminal 30B are respectively connected with the rectifier 331 and the switch element 334, the locations of the higher-frequency part and the lower-frequency part are exchanged.

Figure 9B:
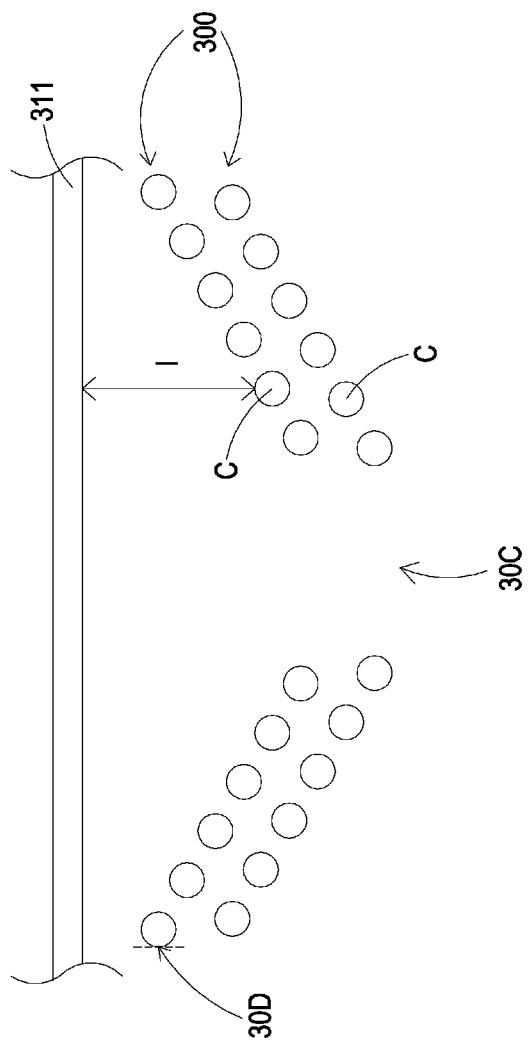
FIG. 9B is a schematic cross-sectional view illustrating the relative locations of the upper case of the case structure and the coil assembly according to a second layout example of the present invention.
Figure 9C:
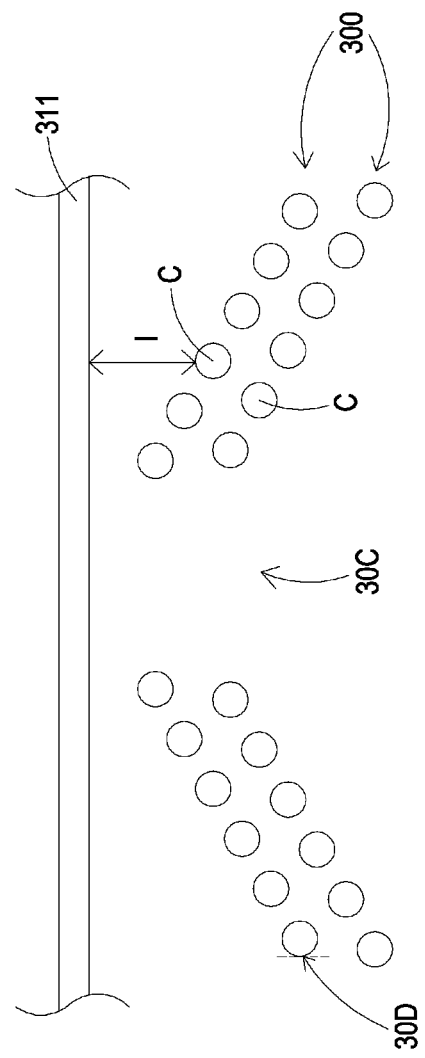
FIG. 9C is a schematic cross-sectional view illustrating the relative locations of the upper case of the case structure and the coil assembly according to a third layout example of the present invention.

In the above embodiment, each coil unit 300 of the coil assembly 30 is a multi-turn planar spiral coil structure. Nevertheless, the profile of the coil unit 300 may be varied according to the practical requirements. For example, the coil unit 300 of the coil assembly 30 may have a conical profile. As shown in FIG. 9B, from the central hollow portion 30C to the outer border D, the distance I between the upper case 311 and the loop C of the coil unit 300 that is closest to the upper case 311 is gradually decreased. As shown in FIG. 9C, from the central hollow portion 30C to the outer border D, the distance I between the upper case 311 and the loop C of the coil unit 300 that is closest to the upper case 311 is gradually increased. According to the operating frequency of the loop C, the distance I is adjusted in order to enhance the operating efficiency of the electrical device 3.

From the above description, the number of coil units of the coil assembly and the sizes of the vacant portion and the spacing interval of the loops are varied according to the practical requirements. In addition, the insulation structure as shown in FIG. 3A may facilitate supporting the coil assembly. In some embodiments, after the coil assembly is fabricated, the coil assembly may be fixed by an adhesive medium or a supporting element in order to maintain the overall profile of the coil assembly. Since the forced-convection airflow may flow through the vacant portion and the spacing interval, the heat-efficiency of the electrical device is enhanced. Moreover, since there is a vacant portion between every two adjacent loops of each coil unit, the interference between the loops will be reduced. In this situation, the eddy current generated from adjacent loops is reduced, and thus the overall performance of the electrical device is not impaired.

Moreover, in a case that the coil assembly is applied to an electrical device, the performance of the electrical device may be optimized by changing the winding approach, the locations of the first terminal and the second terminal with respect to the coil driving circuit and the distance between the coil assembly and the upper case. The electrical device is not limited to the induction cooker. The electrical device of the present invention may be any other heating device that uses the coil assembly to generate electromagnetic induction.

From the above description, the coil assembly of the present invention includes plural coil units in a stack arrangement. In addition, there is a vacant portion between every two loops of each coil unit. The loops of each coil unit are aligned with the vacant portions W of an adjacent coil unit. In addition, there is a spacing interval between every two adjacent loops of every two adjacent coil units. Since the forced-convection airflow may flow through the vacant portion and the spacing interval, the heat-efficiency of the electrical device is enhanced. Moreover, since there is a vacant portion between every two adjacent loops of each coil unit, the interference between the loops will be reduced, and the overall operating efficiency of the electrical device is not impaired. Moreover, since the coil units of the coil assembly are stacked on each other, the diameter of the coil assembly is not considerably increased. In other words, the overall volume of the coil assembly is not considerably increased. Since the coil assembly of the present invention may be fully sheltered by the foodstuff container, the operating efficiency of the electrical device is enhanced.

Moreover, in a case that the coil assembly is fabricated by the first winding approach and the higher-frequency coil unit is closer to the upper case, the performance of the electrical device may be optimized by adjusting the distance between the loop of the coil unit and the upper case.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electrical device, comprising:
a coil assembly comprising plural coil units in a stack arrangement, wherein each of said coil units comprises alternate loops and vacant portions, said loops of each coil unit are aligned with said vacant portions of a next coil unit of said stack arrangement, and there is a spacing interval between every two adjacent loops of a coil unit and a next coil unit of said stack arrangement, so that an airflow flows through said vacant portions and said spacing interval; and
a case structure having a receptacle for accommodating said coil assembly.

2. The electrical device according to claim 1, wherein said coil units of said coil assembly are produced by winding a conductive article, wherein said coil assembly comprises a first terminal, a second terminal, a central hollow portion and an outer border.

3. The electrical device according to claim 2, wherein said first terminal and said second terminal of said coil assembly are respectively arranged beside said central hollow portion and said outer border, or said first terminal and said second terminal of said coil assembly are respectively arranged beside said outer border and said central hollow portion.

4. The electrical device according to claim 2, wherein both of said first terminal and said second terminal of said coil assembly are arranged beside said central hollow portion, or both of said first terminal and said second terminal of said coil assembly are arranged beside said outer border.

5. The electrical device according to claim 2, wherein every two adjacent loops of each coil unit are connected with each other.

6. The electrical device according to claim 2, wherein any loop of each coil unit is connected with an adjacent loop of a next coil unit.

7. The electrical device according to claim 2, wherein said case structure comprises an upper case and a lower case for collectively defining said receptacle.

8. The electrical device according to claim 7, wherein said coil unit that is the closest to said upper case of said case structure is separated from said upper case by a specified distance, wherein from said central hollow portion to said outer border, said specified distance is unchanged, gradually increased or gradually decreased.

9. The electrical device according to claim 2, further comprising a coil driving circuit, which is mounted on a circuit board, and comprises:
- a rectifier for receiving an input current and rectifying said input current;
- a controlling circuit;
- a switch driving circuit connected with said controlling circuit and controlled by said controlling circuit; and
- a switch element connected with said switch driving circuit, wherein on/off states of said switch element is controlled by said controlling circuit, wherein said first terminal and said second terminal of said coil assembly are respectively connected with said rectifier and said switch element, or said first terminal and said second terminal of said coil assembly are respectively connected with said switch element and said rectifier.

10. The electrical device according to claim 9, wherein said plural coil units of said coil assembly at least comprise a first coil unit and a second coil unit, every two adjacent loops of said first coil unit are connected with each other, said first terminal of said coil assembly is connected with said switch element, and said first coil unit is closer to an upper case of said case structure than said second coil unit.

11. The electrical device according to claim 1, further comprising an insulation structure and a magnetic element, wherein said coil assembly and said magnetic element are disposed on said insulation structure.

12. A coil assembly for use in an electrical device, said coil assembly comprising plural coil units in a stack arrangement, wherein each of said coil units comprises alternate loops and vacant portions, said loops of each coil unit are aligned with said vacant portions of a next coil unit of said stack arrangement, and there is a spacing interval between every two adjacent loops of a coil unit and a next coil unit of said stack arrangement, so that an airflow flows through said vacant portions and said spacing interval.

* * * * *